(12) United States Patent  (10) Patent No.: US 9,060,322 B2
Zou et al.  (45) Date of Patent: Jun. 16, 2015

(54) METHOD AND SYSTEM FOR PREVENTING LOOPS IN MESH NETWORKS

(75) Inventors: Xu Zou, San Jose, CA (US); Kangchang Huang, Beijing (CN); Yan Liu, Santa Clara, CA (US)

(73) Assignee: ARUBA NETWORKS, INC., Sunnyvale, CA (US)

( * ) Notice: Subject to any disclaimer, the term of this patent is extended or adjusted under 35 U.S.C. 154(b) by 273 days.

(21) Appl. No.: 13/281,072

(22) Filed: Oct. 25, 2011

(65) Prior Publication Data

US 2013/0100872 A1  Apr. 25, 2013

(51) Int. Cl.
| | |
|---|---|
| *H04L 12/28* | (2006.01) |
| *H04W 4/00* | (2009.01) |
| *H04W 40/02* | (2009.01) |
| *H04L 12/705* | (2013.01) |
| *H04L 12/715* | (2013.01) |
| *H04L 12/707* | (2013.01) |

(52) U.S. Cl.
CPC .............. *H04W 40/02* (2013.01); *H04L 45/04* (2013.01); *H04L 45/18* (2013.01); *H04L 45/24* (2013.01)

(58) Field of Classification Search
USPC ................ 370/312–338, 401–455, 389–392; 709/239–242
See application file for complete search history.

(56) References Cited

U.S. PATENT DOCUMENTS

| | | | | |
|---|---|---|---|---|
| 6,498,795 B1* | 12/2002 | Zhang et al. | ................. | 370/400 |
| 6,603,740 B1* | 8/2003 | Du | ................. | 370/248 |
| 6,879,594 B1* | 4/2005 | Lee et al. | ................. | 370/408 |
| 7,221,651 B2* | 5/2007 | Mizoguchi et al. | .......... | 370/241 |
| 7,522,540 B1* | 4/2009 | Maufer | .................. | 370/254 |
| 7,606,178 B2* | 10/2009 | Rahman et al. | ............... | 370/256 |
| 7,660,318 B2* | 2/2010 | Rahman et al. | ............... | 370/401 |
| 7,792,021 B1* | 9/2010 | Pankajakshan | ............... | 370/229 |
| 7,864,712 B2* | 1/2011 | Khan et al. | ................... | 370/256 |
| 7,864,809 B2* | 1/2011 | Kim et al. | .................... | 370/492 |
| 7,869,345 B2* | 1/2011 | Scudder et al. | ............... | 370/217 |
| 2006/0265480 A1 | 11/2006 | Kim et al. | | |
| 2006/0268749 A1 | 11/2006 | Rahman et al. | | |
| 2007/0076730 A1 | 4/2007 | Rahman et al. | | |
| 2007/0110024 A1* | 5/2007 | Meier | .................... | 370/351 |

FOREIGN PATENT DOCUMENTS

EP  1164750  12/2001

OTHER PUBLICATIONS

European Application No./Patent No. 12189599.9; Extended European Search Report; Mailed Aug. 30, 2013.

* cited by examiner

*Primary Examiner* — Man Phan
(74) *Attorney, Agent, or Firm* — Ying Wang

(57) ABSTRACT

The present disclosure discloses a network device and/or method for preventing loops in routing paths of network frames in a wireless digital network. The disclosed network device at a network node receives a frame from a wired network. The frame includes a site identifier uniquely corresponding to the wired network, a source physical address, and a destination physical address. If the network node is selected as a representative portal node, the network device forwards the frame. Otherwise, if another network node is selected as the representative portal node, the network device drops the received frame to prevent forming a loop in a routing path corresponding to the frame. If not other network is selected as the representative portal node, the network device floods the frame to other network nodes in the wireless network.

22 Claims, 7 Drawing Sheets

METHOD AND SYSTEM FOR PREVENTING LOOPS IN MESH NETWORKS

BACKGROUND OF THE INVENTION

The present disclosure relates to packet routing protocols in a wireless digital network. In particular, the present disclosure relates to loop prevention in routing paths through an effective routing protocol in wireless mesh networks.

Wireless digital networks, such as networks operating under Electrical and Electronics Engineers (IEEE) 802.11 standards, are spreading in their popularity and availability. With such popularity, however, come problems of routing management. Specifically, network frames from one or more wired networks (or sites) need to be routed through a wireless mesh network to reach one or more other wired networks (or sites) without forming any loop inside the wireless mesh network.

Typically, wireless routing protocols in wireless mesh networks use Spanning Tree Protocol (STP) to prevent loops in the routing paths. STP first looks for redundant links in a network and selects the best paths. Its initial goal is to put all links in either forwarding or blocking state. In the end, the links without a redundant link and the best links with a redundant link would be in forwarding state. The redundant links that weren't as good as the selected links would be in blocking state. However, Spanning Tree cannot use multiple links to the same destination. Therefore, there is no load sharing or load balancing when a wireless network uses STP. Any redundant link that is not as preferred is blocked (i.e., shut down) until the primary link goes down.

STP uses three criteria to determine whether an interface should be in forwarding state are:

(1) All interfaces on the root bridge are put in forwarding state.

(2) For other bridges that are not the root bridge, the port that is closest to the root bridge is put in forwarding state.

(3) The bridge with the lowest administrative distance to the root bridge is called the designated bridge. The network interface on the designated bridge is called the designated port. That port is put into forwarding state.

With the use of STP, because the "best ports" are put into forwarding state and the other ports are put into blocking state, there are no loops in the network. When a new node is introduced to the network, the port states will be recalculated to prevent a new loop. However, STP do not allow for multiple active gateways, or load balancing across multiple paths, because they are limited to one gateway and selection of one particular path based on tree topology. Thus, it is desirable to have a routing protocol that can prevent loops in routing paths within wireless networks, and meanwhile support multiple active portals as well as load balancing.

BRIEF DESCRIPTION OF THE DRAWINGS

The present disclosure may be best understood by referring to the following description and accompanying drawings that are used to illustrate embodiments of the present disclosure.

DETAILED DESCRIPTION

Figure 1:
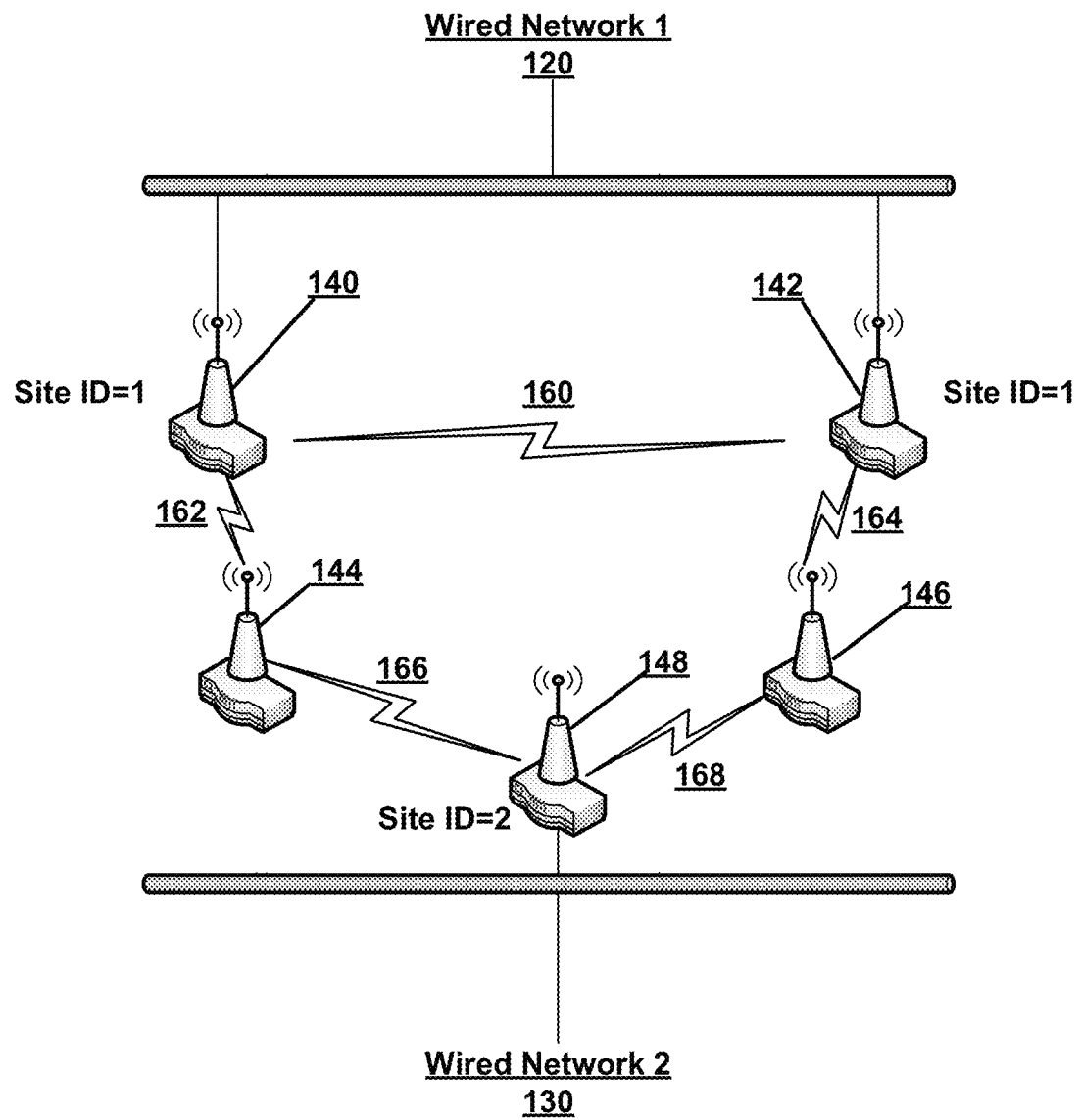
FIG. 1 shows an exemplary wireless digital network environment according to embodiments of the present disclosure.

In the following description, several specific details are presented to provide a thorough understanding. While the context of the disclosure is directed to routing management of wireless networks, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

Overview

Embodiments of the present disclosure relate to packet routing protocols in a wireless digital network and, particularly, to loop prevention in routing paths through an effective routing protocol. Embodiments of the present disclosure provide a solution that prevents loop in routing paths within the network, and meanwhile support multiple active portals as well as load balancing.

With the solution provided herein, the disclosed network device at a network node receives a frame from a wired network. The frame includes a site identifier uniquely corresponding to the wired network, a source physical address, and a destination physical address. If the network node is selected as a representative portal node, the network device forwards the frame. Otherwise, if another network node is selected as the representative portal node, the network device drops the received frame to prevent forming a loop in a routing path corresponding to the frame. If not other network is selected as the representative portal node, the network device floods the frame to other network nodes in the wireless network.

In some embodiments, if no other network node in the wireless network is selected as the representative portal node, the network device determines whether the destination physical address exists in a forwarding table. If so, the network device transmits the frame to a corresponding network node at a forwarding address corresponding to the destination physical address in the forwarding table. Otherwise, the network device floods the frame to one or more other network nodes in the wireless network. In one embodiment, to determine whether any other network node in the wireless network is selected as the representative portal node, the network device identifies one or more other network nodes which are portal nodes associated with the wired network from which the frame is received; sends an inquiry packet comprising the site identifier and the destination physical address; receives a response from the one or more other network nodes; and determines whether any of the one or more other network nodes is selected as the representative portal node based on the response.

In some embodiments, the network device also determines whether the destination physical address indicates that the frame is a multicast frame. If so, the network device will multicast the frame to a group of network nodes based on the destination physical address.

In some embodiments, the network device also determines whether the source physical address is associated with any previously received frame. If not, the network device drops the frame. In addition, the network device may store the source physical address. The network device may additionally and optionally determine whether the source physical address is known to any portal node associated with the site identifier. If so, the network device will associate the source physical address with the portal node associated with the site identifier in a forwarding table. If not, the network device will associate the source physical address with the network node corresponding to itself in the forwarding table Overview FIG. 1 shows an exemplary wireless digital network environment according to embodiments of the present disclosure. FIG. 1 includes a first wired network, i.e., wired network 1 120, and a second wired network, i.e., wired network 2 130, as well as a mesh network that includes mesh network nodes 140-148 which are coupled to each other through wireless radio links 160-168. In addition, mesh network nodes 140 and 142 are both coupled to wired network 1 120. Therefore, mesh network nodes 140 and 142 are each assigned a site identifier "1," which indicates that they are coupled to the first wired network. Likewise, mesh network node 148 is coupled to wired network 2 130. Thus, mesh network node 148 is assigned a site identifier "2," which indicates that it is coupled to the second wired network. Mesh network nodes that are coupled to a wired network are commonly referred to as a "portal node" or a "gateway." The term "mesh portal," "portal node," "portal," "gateway," or "gateway node" are used interchangeably in the present disclosure. In effect, mesh network as depicted in FIG. 1 bridges two disjoint wired layer 2 networks into a single layer 2 network using wireless links. Therefore, we configure for respective portal nodes to distinguish the disjoint layer 2 networks. Note that the value of the site identifier (e.g., "1" for mesh network nodes 140 and 142; and "2" for mesh network node 148) can be arbitrarily assigned. Any value can be used as long as the value uniquely identifies a wired network (also referred to as "site").

The site identifier for each portal node can be configured by a network administrator. Once the correct site identifier is configured on all portal nodes, such site identifier configuration information will be distributed to other nodes in the wireless mesh network. In the example illustrated above with respect to FIG. 1, nodes 144 and 146 will receive the configuration information that portal nodes 140 and 142 are associated with site identifier "1" and that portal node 148 is associated with site identifier "2." Each mesh node will then select a representative portal node for each wired network (or each site). After the representative portal node is selected, traffic between a respective mesh node and a respective site will only go through the mesh node's selected representative portal node.

To select the representative portal for each site, each mesh node will contact all mesh portals to get each portal's information prior to selecting the representative portal for each site. If a mesh node is a portal mesh node, the portal mesh node will always select itself as the representative portal for the site it connects. If a mesh node is a non-portal mesh node, the non-portal mesh node selects its representative portal for each site by considering one or more of the following factors:

The portal's reachability;
The portal's current load (i.e., number of nodes the portal has already represented; the traffic load of the portal; etc.);
Hop count or metric from the node to the portal After the representative portal for each site is selected, a mesh node can start sending and/or receiving traffic to and from a respective site through the selected representative portal. For example, in FIG. 1, mesh node 144 can choose portal node 140 as the representative portal for site 1. Moreover, mesh node 146 and 148 can choose portal node 142 as their representative portal for site 1. Accordingly, all traffic between mesh node 144 and wired network 1 120 will only be forwarded to portal mesh node 140, and not mesh nodes 142, 146 or 148. On the other hand, all traffic between mesh node 146 or 148 and wired network 1 120 will only be forwarded to mesh node 142, and not mesh nodes 140 or 144. Hence, by allowing such gateway selection, the routing protocol disclosed herein allows network traffic to the same site, such as wired network 1 120 to be routed through multiple portal nodes, and thereby supports network load balancing within the wireless mesh networks.

Exemplary Network Frame Format

Figure 2:
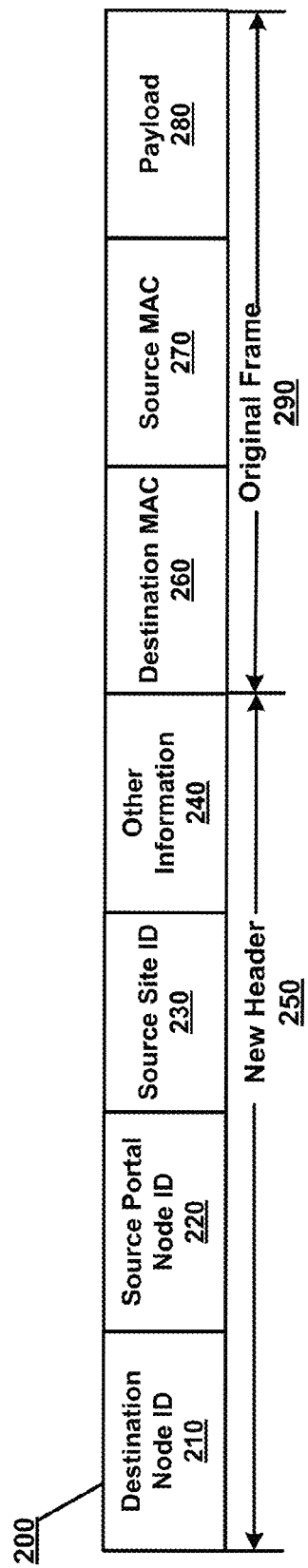
FIG. 2 is a block diagram illustrating an exemplary network frame format used to prevent loops in wireless mesh networks according to embodiments of the present disclosure.

FIG. 2 shows an exemplary network frame format used to prevent loops in wireless mesh networks according to embodiments of the present disclosure. Network frame 200 illustrated in FIG. 2 includes original frame 290 and new header 250. Original frame 290 typically follows standard layer 2 packet header format, and includes destination Media Access Control (MAC) address 260, source MAC address 270, and payload information 280. New header 250 includes destination node identifier 210, source portal node identifier 220, source site identifier 230, and other information 240.

In some embodiments, when network frame 200 is routed into the mesh network via any portal node, the portal node encapsulates original frame 290 with new header 250. Among other information, source site identifier 230, which indicates the corresponding wired network that the frame enters the mesh network from, and the portal node's node identifier 220 are inserted into new header 250. As network frame 200 is being routed to destination mesh nodes, each intermediate mesh node in the routing path keeps track of network frame 200's (i) source MAC address 270, (ii) node identifier 220 of the mesh portal node through which network frame 200 enters into the mesh network, (iii) source site identifier 230, and (iv) any other information 240 related to network frame forwarding, such as Quality of Service (QoS), security, etc. In one embodiment, the mesh node inserts a tuple <source MAC address 270, node identifier 220, source site identifier 230> into a forwarding table to track network frame 200's related information.

Exemplary Routing Scenarios for Preventing Loops in Wireless Mesh Networks

Figure 3A:
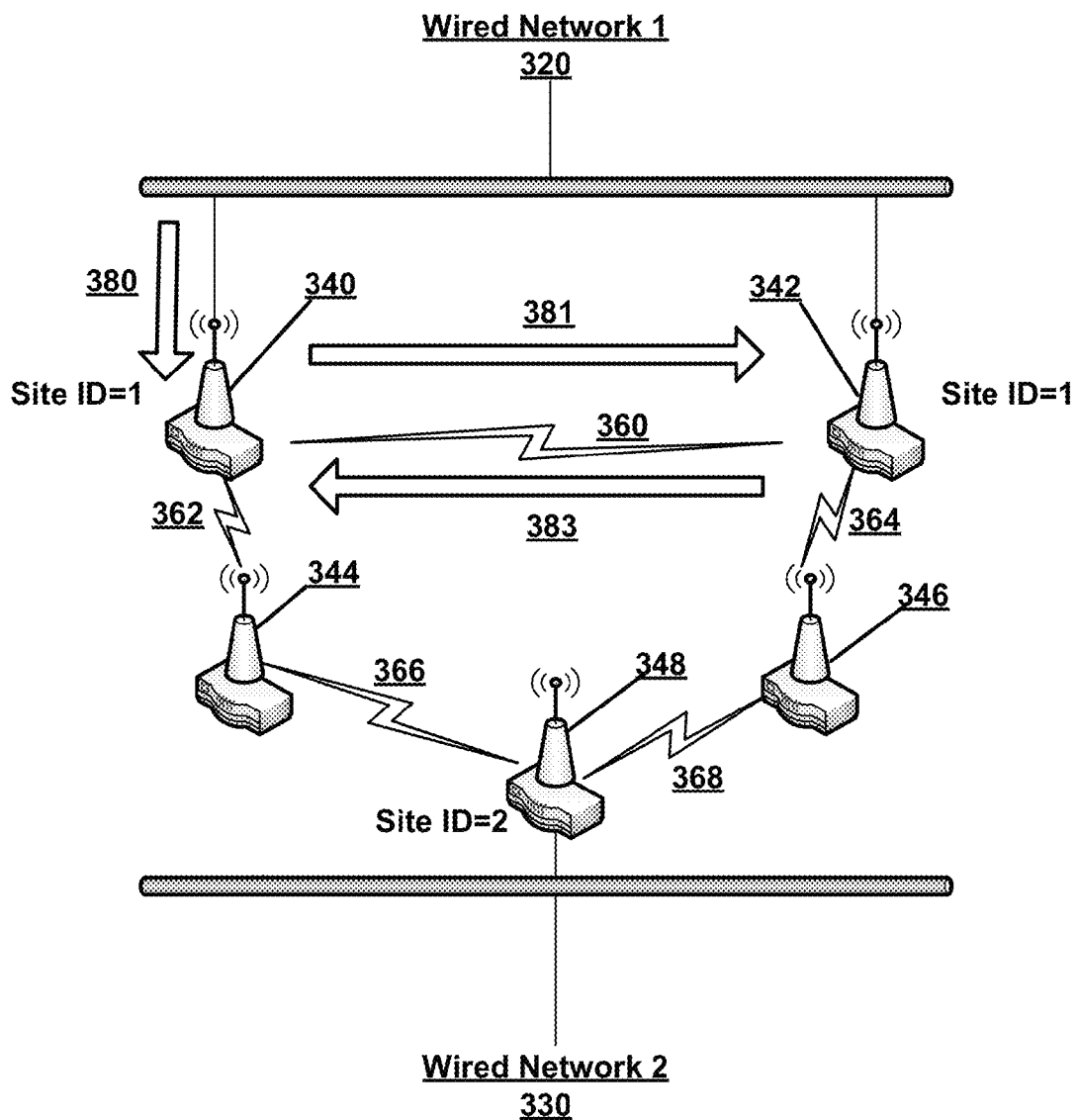
FIG. 3A-3C each shows a respective exemplary wireless network routing scenario for preventing loops in wireless mesh networks according to embodiments of the present disclosure.
Figure 3B:
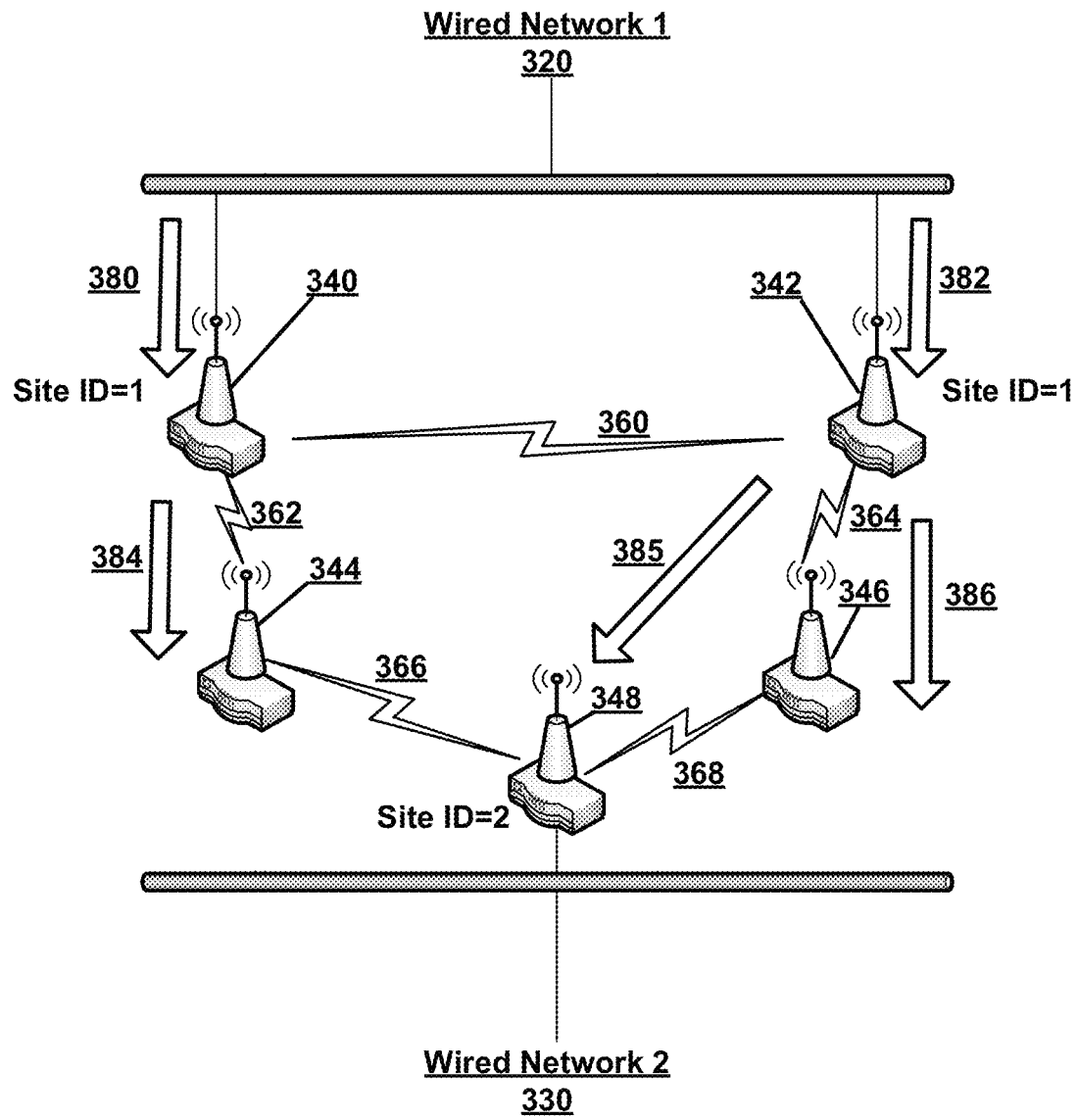
Figure 3C:
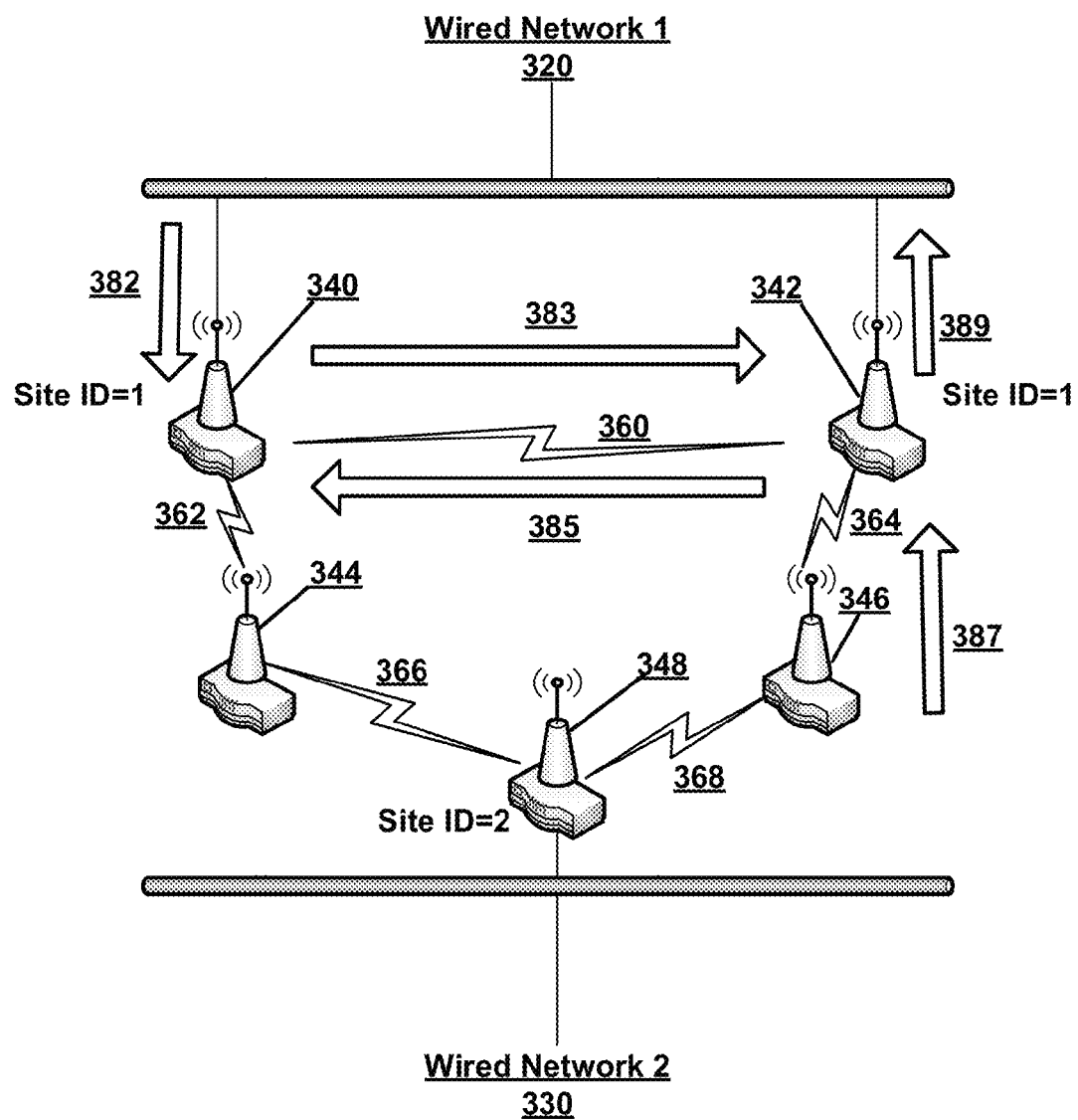

FIG. 3A-3C each shows a respective exemplary wireless network routing scenario for preventing loops in wireless mesh networks according to embodiments of the present disclosure.

(1) Scenario A: Network Frame is Originated from Outside of a Mesh Network with Source MAC Address Unknown to the Mesh Network FIG. 3A shows a first exemplary wireless network routing scenario for preventing loops. In this example, a network frame is originated from outside of a mesh network with source MAC address unknown to the mesh network. FIG. 3A includes a first wired network, i.e., wired network 1 320, and a second wired network, i.e., wired network 2 330, as well as a mesh network that includes mesh network nodes 340-348 which are coupled to each other through wireless radio links 360-368. In addition, mesh network nodes 340 and 342 are both coupled to wired network 1 320. Therefore, mesh network nodes 340 and 342 are each assigned a site identifier value, e.g., "1," which indicates that they are coupled to the first wired network. Likewise, mesh network node 348 is coupled to wired network 2 330. Thus, mesh network node 348 is assigned another site identifier value, e.g., "2," which indicates that it is coupled to the second wired network. Note that the value of each site identifier uniquely identifies a respectively wired network coupled to the wireless mesh network.

When a network frame is routed into the mesh networks from outside for the first time (operation 380), for example, from wired network 1 320 through mesh portal node 340 (or mesh portal node 342), because mesh portal node 340 (or mesh portal node 342) does not know the network frame's source MAC address yet, mesh portal node 340 (or mesh portal node 342) will drop the frame (not shown), and then inquire whether other portal nodes of the same site, i.e. wired network 1 320, recognize the network frame's source MAC address. In the example illustrated in FIG. 3A, mesh portal node 340 will inquire the other mesh portal node 342 that also has a site identifier value of "1" through wireless radio link 360 whether mesh portal node 342 knows the network frame's source MAC address (operation 381).

Upon receiving the inquiry from mesh portal node 340, mesh portal node 342 will reply with either "No" or "Yes" (operation 383). Assuming that mesh portal node 342 replies with "No," mesh portal node 340 will then store the network frame's source MAC address, its own portal node identifier, and its corresponding site identifier for future queries. In some embodiments, mesh portal node 340 maintains a database to keep track of network frame's source MAC address, node identifier of mesh portal node 340, source site identifier corresponding to wired network 1 320, and any other information related to network frame forwarding, such as Quality of Service (QoS), security, etc. In one embodiment, mesh portal node 340 inserts a tuple <source MAC address, portal node identifier, site identifier> and other related information into its database.

If two or more other mesh portal nodes are coupled to the same site, mesh portal node 340 will store the information regarding source MAC address, portal node identifier, site identifier, etc., if all of the responses received from other portal nodes are "No." If, on the other hand, any mesh portal node replies to mesh portal node 340's inquiry with "Yes," mesh portal node 340 will store the information regarding source MAC address into the database. Nevertheless, mesh portal node 340 will also note that the source MAC address has already been handled by other mesh portal on the same site when storing such information.

(2) Scenario B: Network Frame is Originated from Outside of the Mesh Network with Source MAC Address Known to the Mesh Network FIG. 3B shows a second exemplary wireless network routing scenario for preventing loops. In this example, a network frame is originated from outside of a mesh network with source MAC address known to the mesh network. FIG. 3B includes a first wired network, i.e., wired network 1 320, and a second wired network, i.e., wired network 2 330, as well as a mesh network that includes mesh network nodes 340-348 which are coupled to each other through wireless radio links 360-368. In addition, mesh network nodes 340 and 342 are both coupled to wired network 1 320. Therefore, mesh network nodes 340 and 342 are each assigned a site identifier value, e.g., "1," which indicates that they are coupled to the first wired network. Likewise, mesh network node 348 is coupled to wired network 2 330. Thus, mesh network node 348 is assigned another site identifier value, e.g., "2," which indicates that it is coupled to the second wired network. Note that the value of each site identifier uniquely identifies a respectively wired network coupled to the wireless mesh network.

When a network frame enters into the mesh network from outside, e.g., wired network 1 320, with source MAC address already known by the mesh network (operation 380), mesh portal node 340 (or mesh portal node 342) will attempt to forward the received network frame according to the frame's destination MAC address as if mesh portal node 340 (or mesh portal node 342) is performing standard layer 2 switching (operation 384).

To do so, first, mesh portal node 340 (or mesh portal node 342) uses the network frame's destination MAC address to look up the corresponding entry in a forwarding table. If the network frame's destination MAC address does not exist in the forwarding table or if the destination MAC address is a multicast address, mesh portal node 340 (or mesh portal node 342) will flood the frame to all other mesh nodes which select the portal as the representative portal for the site.

For example, if mesh portal node 340 receives, from wired network 1 320, a network frame with an destination MAC address that is unknown to the wireless mesh network (operation 380), mesh portal node 340 will flood the received network frame to mesh node 344 (operation 384), because mesh node 344 has selected mesh portal 340 as the representative portal for wired network 1 320.

As another example, if mesh portal node 342 receives, from wired network 1 320, a network frame with destination MAC address that is unknown to wireless mesh network (operation 382), mesh portal node 342 will flood the received network frame to mesh node 346 (operation 386) and mesh node 348 (operation 385), because both mesh node 346 and mesh node 348 have selected mesh portal node 342 as the representative portal for wired network 1 320.

In some embodiments, the flood operation described above is performed by encapsulating the frame with the new header introduced above and unicasts the frame to each destination node. For instance, when mesh portal node 342 receives a network frame with an unknown destination MAC address, mesh portal node 342 will encapsulate the original frame with the new header as illustrated in Table 1, and send the encapsulated frame to mesh node 146 and mesh node 148.

TABLE 1

| New header | | | |
| --- | --- | --- | --- |
| Destination Node Identifier | Source Portal Node Identifier | Source Site Identifier | Other information |
| mesh node 346 or mesh node 348 | mesh node 342 | 1 | other |

In some embodiments, if the destination MAC address is found in the forwarding table but the mesh node corresponding to the destination MAC address does not select the receiving mesh portal node as its representative portal for the site, the portal node will drop the frame to prevent loops in routing paths within the wireless mesh network. For example, assuming that mesh portal node 340 receives a network frame from wired network 1 320 and the received network frame's destination MAC address is a client associated with mesh node 346. Because mesh node 346 has already selected mesh portal node 342 as its representative portal for wired network 1 320, node 340 will drop the network frame to avoid any loop.

In some embodiments, if the destination MAC address is found in the forwarding table and the mesh portal node has been selected as the representative portal for the site, the mesh portal node will encapsulate the original frame with a new header described above with reference to FIG. 2, and will forward the encapsulated frame to the destination MAC address. For example, assuming that mesh portal node 340 receives a network frame from wired switch network 1 320 to a destination MAC address of a client associated with mesh node 344. Because mesh node 344 has selected mesh portal node 340 as its representative portal for wired network 1 320, mesh portal node 340 will encapsulate the received frame with a new header as illustrated below in Table 2, and forward the encapsulated frame to mesh node 344 through unicast.

TABLE 2

| New header | | | |
| --- | --- | --- | --- |
| Destination Node Identifier | Source Portal Node Identifier | Source Site Identifier | Other information |
| mesh node 344 | mesh node 340 | 1 | other |

(3) Scenario C: Network Frame is Originated from Client Devices Inside a Wireless Mesh Network with Unknown Destination MAC Address FIG. 3C shows a third exemplary wireless network routing scenario for preventing loops. In this example, a network frame is originated from client devices inside a wireless mesh network with destination MAC address unknown to the wireless mesh network. FIG. 3C includes a first wired network, i.e., wired network 1 320, and a second wired network, i.e., wired network 2 330, as well as a mesh network that includes mesh network nodes 340-348 which are coupled to each other through wireless radio links 360-368. In addition, mesh network nodes 340 and 342 are both coupled to wired network 1 320. Therefore, mesh network nodes 340 and 342 are each assigned a site identifier value, e.g., "1," which indicates that they are coupled to the first wired network. Likewise, mesh network node 348 is coupled to wired network 2 330. Thus, mesh network node 348 is assigned another site identifier value, e.g., "2," which indicates that it is coupled to the second wired network. Note that the value of each site identifier uniquely identifies a respectively wired network coupled to the wireless mesh network.

In this case, a network frame is generated from a client device inside the wireless mesh network, for instance, a wireless client coupling to mesh node 346 in FIG. 3C. If mesh node 346 does not know the network frame's destination MAC address or if the network frame's destination MAC address is a multicast address, mesh node 346 will forward the received network frame to all related nodes (operation 387). The network frame will eventually reach all mesh portal nodes. Each mesh portal node follows rules described above to determine whether it should forward the network frame into the wired network.

In the example illustrated in FIG. 3C, because mesh node 346 has selected mesh portal node 342 as its representative portal of wired network 1 320, mesh portal node 340 will drop and not forward any flooded network frames received from mesh node 346 into wired network 1 320. Rather, the network frame will be routed into wired network 1 320 through mesh portal node 342 (operation 389), and may further reach mesh portal node 340 again from wired network 1 320 (operation 382). When the same network frame is routed to mesh portal node 340 again, because mesh portal node 340 has received the flooded network frame from mesh node 346 before, mesh portal node 340 will know that the source MAC address is originated from mesh clients inside the wireless mesh network. Therefore, mesh portal node 340 will drop the network frame received from wired network 1 320 to avoid loop.

Assuming that mesh portal node 340 has not received the flooded frame from mesh node 346 in the past for reasons such as packet losses, mesh portal node 340 will still drop the network frame, because the destination MAC address is not known to mesh portal node 340. However, mesh portal node 340 will inquire other portal nodes of the same site (e.g. mesh portal node 342) whether the destination MAC address is known (operation 383). In this example, mesh portal node 342 will reply that the destination MAC is known in wired network 1 320 (operation 385). Subsequently, mesh portal node 340 will record the MAC address into a forwarding table maintained by mesh portal node 340.

Wireless Mesh Network Loop Prevention Process

Figure 4:
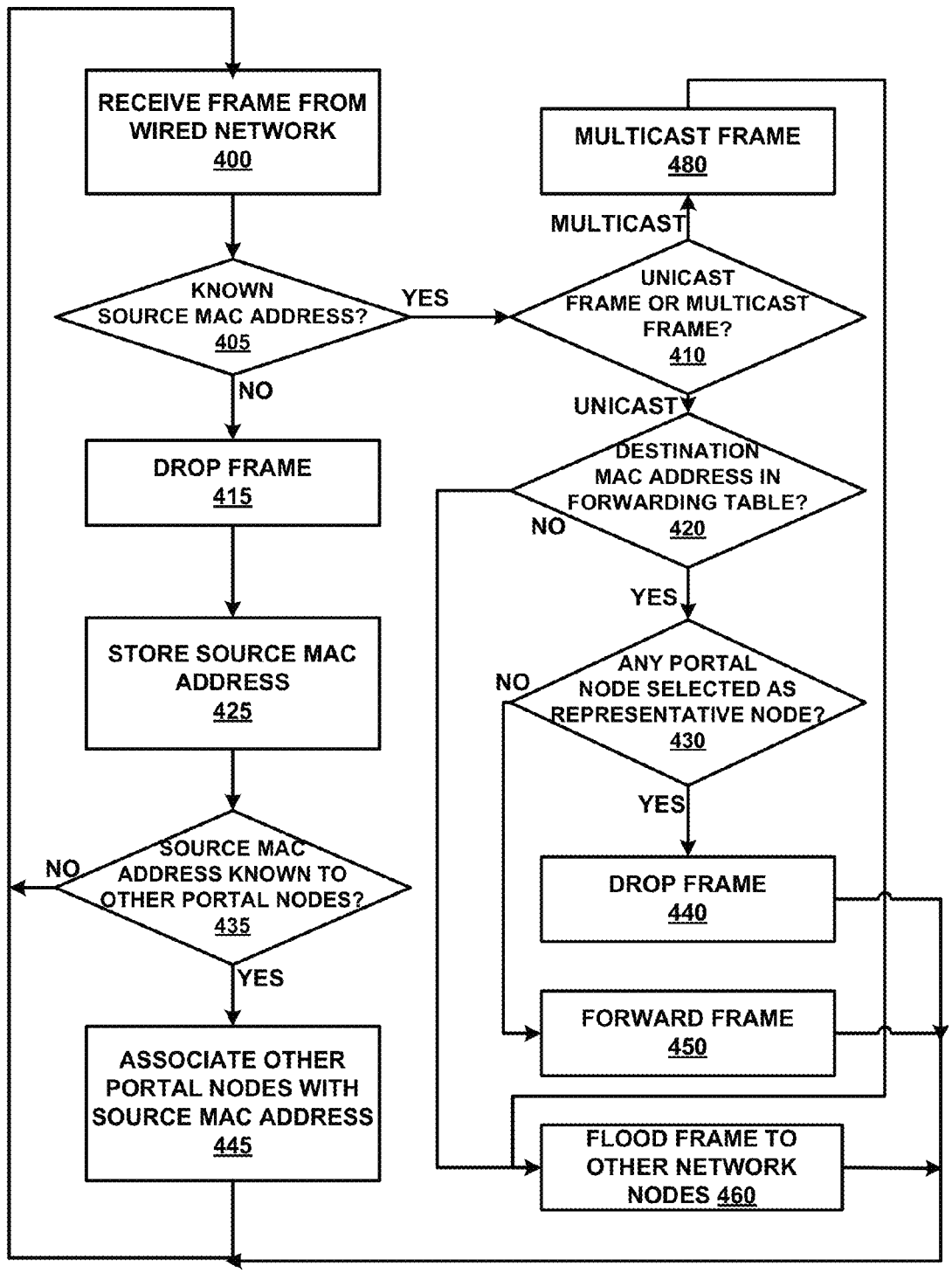
FIG. 4 is a flowchart illustrating an exemplary process of preventing loops in wireless mesh networks according to embodiments of the present disclosure.

FIG. 4 is a flowchart illustrating the process of preventing loops in wireless mesh networks. During operation, a mesh node receives a network frame from a wired network (operation 400). The mesh node then determines whether the source MAC address associated with the received network frame is known to the wireless mesh network (operation 405).

If the source MAC address associated with the network frame is known, the mesh node next determines whether the network frame is a unicast packet or a multicast packet (operation 410). If the network frame is determined to be a multicast packet (operation 480), the mesh node will treat the frame as a broadcast frame and flood the network frame to other mesh nodes (operation 460). Alternatively, the mesh node may determine the address of the multicast group (operation 480), and transmit the packet to mesh nodes within the multicast group (not shown).

On the other hand, if the network frame is a unicast packet, the mesh node will further determine whether the destination MAC address exists in a forwarding table maintained by the mesh node (operation 420). If the destination MAC address does not exist in the forwarding table, the mesh node floods the network frame to other mesh nodes (operation 460). If, however, the destination MAC address exists in the forwarding table, the mesh node retrieves the entry corresponding to the destination MAC address from the forwarding table, and determines whether any other portal node has been selected as the representative node (operation 430).

If another portal node associated with the same site identifier is selected as the representative node, the mesh node will drop the network frame (operation 440). Otherwise, the mesh node will forward the network frame (operation 450). In one embodiment, the mesh node will additionally select itself as the representative node and insert a corresponding entry in the forwarding table.

Assuming that after receiving the network from the wired network during operation 400, the mesh node has determined that the source MAC address is not known to the wireless mesh network during operation 405. In such cases, the mesh node will first drop the network frame (operation 415). Next, the mesh node can insert the source MAC address to the forwarding table (operation 425).

Furthermore, the mesh node will inquire other portal nodes associated with the same site identifier, and will determine whether the source MAC address is known to any other portal nodes based on responses received from the other portal nodes (operation 435). If the source MAC address is known to another portal node, the mesh node will associate the other portal node with the source MAC address in the forwarding table (operation 445). In one embodiment, if the source MAC address is not known to any other portal nodes associated with the same site identifier, the mesh node may associate itself with the source MAC address and select itself as the representative portal node for the corresponding sites.

Wireless Mesh Network Loop Prevention System

Figure 5:
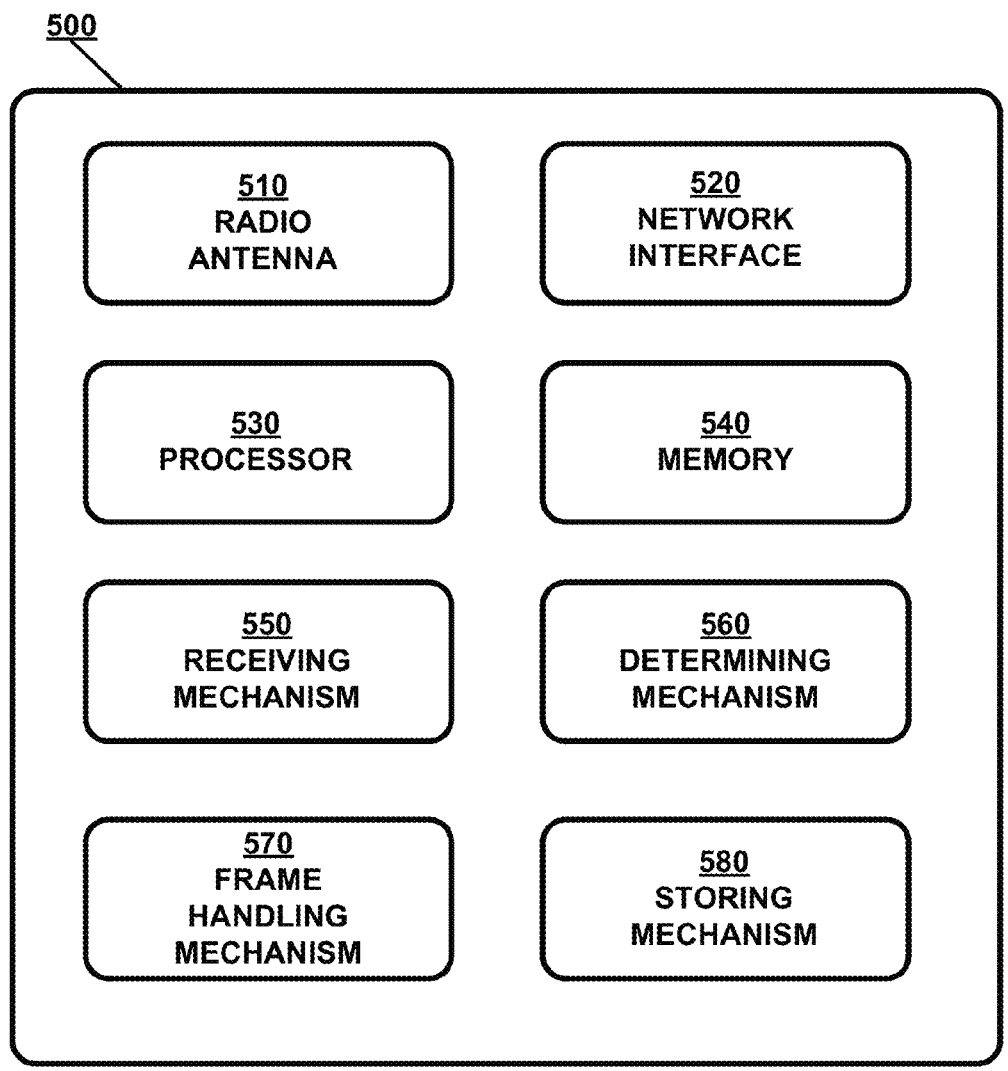
FIG. 5 is a block diagram illustrating a system for preventing loops in wireless mesh networks according to embodiments of the present disclosure.

FIG. 5 is a block diagram illustrating a system for preventing loops in a wireless mesh network according to embodiments of the present disclosure.

Operating as a mesh node in a wireless digital network, network device 500 includes at least one or more radio antennas 510 capable of either transmitting or receiving radio signals or both, a network interface 520 capable of communicating to a wired or wireless network, a processor 530 capable of processing computing instructions, and a memory 540 capable of storing instructions and data. Moreover, network device 500 further includes a receiving mechanism 550, a determining mechanism 560, a frame handling mechanism 570, and a storing mechanism 580, all of which are coupled to processor 530 and memory 540 in network device 500. Network device 500 may be used as a client system, or a server system, or may serve both as a client and a server in a distributed or a cloud computing environment.

Radio antenna 510 may be any combination of known or conventional electrical components for receipt of signaling, including but not limited to, transistors, capacitors, resistors, multiplexers, wiring, registers, diodes or any other electrical components known or later become known.

Network interface 520 can be any communication interface, which includes but is not limited to, a modem, token ring interface, Ethernet interface, wireless IEEE 802.11 interface, cellular wireless interface, satellite transmission interface, or any other interface for coupling network devices.

Processor 530 can include one or more microprocessors and/or network processors. Memory 540 can include storage components, such as, Dynamic Random Access Memory (DRAM), Static Random Access Memory (SRAM), etc. In some embodiments, memory 540 stores a forwarding table. In one embodiment, the forwarding table includes (i) source MAC address, (ii) node identifier of the mesh portal node through which network frame enters into the mesh network, (iii) source site identifier, and (iv) any other information related to network frame handling, such as Quality of Service (QoS), security, etc. In one embodiment, the forwarding table stores tuples in the format of <source MAC address, node identifier, source site identifier> to track network frame's related information.

Receiving mechanism 550 receives one or more network frames via network interface 520 or radio antenna 510. The received network frames may include, but are not limited to, requests and/or responses, beacon frames, management frames, control path frames, and so on, as described in the present disclosure. In some embodiments, receiving mechanism 550 can receive a frame from a wired network. The frame can include a site identifier uniquely corresponding to the wired network, a source physical address, and a destination physical address. In some embodiments, the source physical address and the destination physical address are the Media Access Control (MAC) addresses of the source network node and the destination network node of the frame respectively.

Determining mechanism 560 determined whether the network node is selected as a representative portal node based on the site identifier and the destination physical address. In response to the network node is not selected as the representative portal node, determining mechanism 560 further determines whether any other network node in the wireless network is selected as the representative portal node based on the site identifier and the destination physical address. In response to no other network node in the wireless network is selected as the representative portal node, determining mechanism 560 determines whether the destination physical address exists in a forwarding table at the network device.

Specifically, when determining whether any other network node in the wireless network is selected as the representative portal node, determining mechanism 560 identifies one or more other network nodes which are portal nodes associated with the wired network from which the frame is received. Then, determining mechanism 560 sends an inquiry that includes the site identifier and the destination physical address to the identified network nodes. Subsequently, receiving mechanism 550 receives a response from one or more identified network nodes; and thus determining mechanism 560 can determine whether any of identified network nodes is selected as the representative portal node based on the received response.

In some embodiments, determining mechanism 560 further determines whether the source physical address is associated with any previously received frame, or otherwise become known to any other portal nodes in the wireless network. In some embodiments, determining mechanism 560 also determines whether the source physical address is associated with any previously received frame.

Frame handling mechanism 570 generally handles frame processing functionalities. For example, frame handling mechanism 570 is capable of dropping a frame, forwarding a frame, multicasting or broadcasting a frame, flooding a frame by transmitting the frame to multiple other network nodes in the wireless network, etc. Specifically, in some embodiments, frame handling mechanism 570 can forward a frame to a second network node in response to a first network node being selected as the representative portal node. In some embodiments, frame handling mechanism 570 can drop the received frame to prevent forming a loop in a routing path corresponding to the frame in response to a third network node being selected as the representative portal node.

In some embodiments, frame handling mechanism 570 transmits the frame to a fourth network node at a forwarding address corresponding to the destination physical address in the forwarding table in response to the destination physical address existing in the forwarding table. In other embodiments, frame handling mechanism 570 transmits the frame to one or more other network nodes in the wireless network in response to the destination physical address not existing in the forwarding table.

In some embodiments, frame handling mechanism 570 multicasts the frame to a group of network nodes based on the destination physical address in response to the destination physical address indicating that the frame is the multicast frame.

In some embodiments, if determining mechanism 560 determines that the source physical address is not associated with any previously received frames, frame handling mechanism 570 will drop the frame.

Storing mechanism 580 can store one or more source physical addresses, one or more destination physical addresses, one or more site identifiers, or any other information related to frame handling. Moreover, in some embodiments, storing mechanism 580 associates the source physical address with the portal node associated with the site identifier in a forwarding table in response to the source physical address being known to a portal node. In other embodiments, storing mechanism 580 associates the source physical address with the first network node in the forwarding table in response to the source physical address being known to no portal node.

Receiving mechanism 550, determining mechanism 560, frame handling mechanism 570, and storing mechanism 580 collectively operation with each other to process loop prevention in a mesh network.

According to embodiments of the present disclosure, network services provide by managed network device 400 include, but are not limited to, an Institute of Electrical and Electronics Engineers (IEEE) 802.1x authentication to an internal and/or external Remote Authentication Dial-In User Service (RADIUS) server; an MAC authentication to an internal and/or external RADIUS server; a built-in Dynamic Host Configuration Protocol (DHCP) service to assign wireless client devices IP addresses; an internal secured management interface; Layer-3 forwarding; Network Address Translation (NAT) service between the wireless network and a wired network coupled to the network device; an internal and/or external captive portal; an external management system for managing the network devices in the wireless network; etc.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "access point" (AP) generally refers to receiving points for any known or convenient wireless access technology which may later become known. Specifically, the term AP is not intended to be limited to IEEE 802.11-based APs. APs generally function to allow wireless devices to connect to a wired network via various communications standards.

As used herein, "wireless local area network" (WLAN) generally refers to a communications network links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, "wireless mesh network" generally refers to a communications network made up of radio nodes organized in a mesh topology. Mesh topology generally refers to a type of networking where each node not only captures and disseminates its own data, but also serves as a relay for other nodes. That is, each node in a wireless mesh network shall collaborate to propagate the data in the network. A wireless mesh network typically consists of mesh clients, mesh routers or mesh nodes, gateways or portal nodes, and any other entities which may later become known. Specifically, the term wireless mesh network is not intended to be limited to implementations in accordance with IEEE 802.11, 802.15, and 802.16 technology standards. Rather, wireless mesh networks may be implemented based on any wireless network technology, cellular network technology, or the combination thereof, or any other similar network technologies later become known.

As used herein, the term "mechanism" generally refers to a component of a system or device to serve one or more functions, including but not limited to, software components, electronic components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. The description is this to be regarded as illustrative rather than limiting.

What is claimed is:

1. A method comprising:
   receiving, at a first network node operating as an access point in a wireless network, a frame from a wired network, wherein the frame comprises a site identifier uniquely corresponding to the wired network, a source physical address, and a destination physical address;
   determining, by the access point, whether the source physical address is associated with a frame previously received from a portal node with the site identifier; and
   in response to determining that the source physical address is not associated with a frame previously received from a portal node with the site identifier:
   storing, by the access point, the source physical address,
   determining, by the access point, whether the source physical address is known to any portal node in the wireless network irrespective of a site identifier associated with the portable node,
   responsive to the source physical address being known to a portal node with a different site identifier than the site identifier of the received frame, associating the source physical address with the portal node associated with the site identifier in a forwarding table at the access point, and
   responsive to the source physical address not being known to any portal node in the wireless network, associating the source physical address with the access point in the forwarding table at the access point.

2. The method of claim 1, further comprising:
   in response to determining that the source physical address is associated with a frame previously received by a network node with the same site identifier:

determining, by the access point, whether the access point is selected as a representative portal node based on the site identifier and the destination physical address of the frame, and responsive to determining that the access point is selected as the representative portal node, forwarding, by the access point, the frame to a second network node.

3. The method of claim 2, further comprising:

responsive to the access point not being selected as the representative portal node, determining, by the access point, whether any other network node in the wireless network is selected as the representative portal node based on the site identifier and the destination physical address; and responsive to a third network node being selected as the representative portal node, dropping, by the access point, the received frame to prevent forming a loop in a routing path corresponding to the frame.

4. The method of claim 3, further comprising:

responsive to no other network node in the wireless network being selected as the representative portal node, determining whether the destination physical address exists in a forwarding table at the access point;

responsive to the destination physical address existing in the forwarding table of the access point, transmitting, by the access point, the frame to a fourth network node at a forwarding address corresponding to the destination physical address in the forwarding table; and responsive to the destination physical address not existing in the forwarding table of the access point, transmitting, by the access point, the frame to one or more other network nodes in the wireless network.

5. The method of claim 3, wherein determining whether any other network node in the wireless network is selected as the representative portal node based on the site identifier and the destination physical address further comprises:

identifying, by the access point, one or more other network nodes which are portal nodes associated with the wired network from which the frame is received;

sending, by the access point, an inquiry comprising the site identifier and the destination physical address;

receiving, by the access point, a response from the one or more other network nodes; and determining, by the access point, whether any of the one or more other network nodes is selected as the representative portal node based on the response.

6. The method of claim 1, wherein further in response to determining that the source physical address is associated with a previously received frame:

determining whether the destination physical address indicates that the frame is a multicast frame; and responsive to the destination physical address indicating that the frame is a multicast frame, multicasting the frame to a group of network nodes based on the destination physical address.

7. The method of claim 1, wherein further in response to determining that the source physical address is not associated with a previously received frame:

dropping, by the access point, the frame.

8. The method of claim 1, wherein nodes with the same site identifier indicate that these nodes are directly connected to the same wired network.

9. A network device comprising:
one or more radio antennas;
a hardware processor communicatively coupled to the one or more radio antennas;
a memory unit;
a receiving mechanism coupled to the hardware processor, the receiving mechanism to receive a frame from a wired network, wherein the frame comprises a site identifier uniquely corresponding to the wired network, a source physical address, and a destination physical address;
a determining mechanism coupled to the hardware processor, the determining mechanism to determine whether the source physical address is known to any portal node in a wireless network associated with the site identifier; and
a storing mechanism coupled to the hardware processor, the storing mechanism to store the source physical address at the first network node in response to determining that the source physical address is not associated with a frame previously received by a portal node in the wireless network with the same site identifier,
wherein the storing mechanism associates, in response to the source physical address being known to a portal node with a different site identifier than the received frame, the source physical address with the portal node associated with the site identifier in a forwarding table at the network device; and
wherein the storing mechanism associates, in response to the source physical address being known to no portal node, the source physical address with the network device in the forwarding table at the network device.

10. The network device of claim 9 is a wireless access point.

11. The network device of claim 9, wherein the determining mechanism further determines whether the destination physical address indicates that the frame is a multicast frame; and
wherein the frame handling mechanism multicasts the frame to a group of network nodes based on the destination physical address in response to the destination physical address indicating that the frame is a multicast frame.

12. The network device of claim 9, wherein the determining mechanism is further to determine whether the source physical address is associated with any previously received frame; and
wherein the frame handling mechanism is further to drop the frame in response to the source physical address not being associated with any previously received frame.

13. The network device of claim 9, wherein the determining mechanism to further determine whether the network device is selected as a representative portal node based on the site identifier and the destination physical address, the network device further comprising:
a frame handling mechanism coupled to the hardware processor, the frame handling mechanism to forward, in response to the first network node being selected as the representative portal node, the frame to another network device.

14. The network device of claim 9, wherein the first network node is a wireless access point.

15. The network device of claim 9, wherein nodes with the same site identifier indicate that these nodes are directly connected to the same wired network.

16. A non-transitory computer-readable storage medium storing instructions that when executed by one or more processors within a first network node in a wireless network cause the first network node to:
- analyze a frame received from a wired network, the frame comprises (i) a site identifier uniquely corresponding to the wired network, (ii) a source physical address, and (ii) a destination physical address;
- determine whether the source physical address is associated with a frame previously received from a portal node with the site identifier;
- in response to determining that the source physical address is not associated with a frame previously received from a portal node with the site identifier:
  - store the source physical address, determine whether the source physical address is known to any portal node in the wireless network,
  - responsive to the source physical address being known to a portal node with a different site identifier than the site identifier of the frame, associate the source physical address with the portal node associated with the site identifier in a forwarding table, and
  - responsive to the source physical address not being known to any portal node in the wireless network, associate the source physical address with the first network node in the forwarding table.

17. The non-transitory computer-readable storage medium of claim 16 including instructions that, upon execution by the one or more processors of the first network device, further cause the first network node to:
- in response to determining that the source physical address is associated with a frame previously received from a portal node with the site identifier:
  - determine whether the first network node is selected as a representative portal node based on the site identifier and the destination physical address of the frame, and
  - responsive to determining that the first network node is selected as the representative portal node, forwarding the frame to a second network node.

18. The non-transitory computer-readable storage medium of claim 17 storing further instructions that when executed by the one or more processors within the first network node cause the first network node to:
- determine whether any other network node in the wireless network is selected as the representative portal node based on the site identifier and the destination physical address in response to the first network node not being selected as the representative portal node; and
- drop the received frame to prevent forming a loop in a routing path corresponding to the frame in response to a third network node being selected as the representative portal node.

19. The non-transitory computer-readable storage medium of claim 18 storing further instructions that when executed by the one or more processors within the first network node cause the first network node to:
- determine whether the destination physical address exists in a forwarding table at the first network node in response to no other network node in the wireless network being selected as the representative portal node;
- transmit the frame to a fourth network node at a forwarding address corresponding to the destination physical address in the forwarding table in response to the destination physical address existing in the forwarding table; and
- transmit the frame to one or more other network nodes in the wireless network in response to the destination physical address not existing in the forwarding table.

20. The non-transitory computer-readable storage medium of claim 18, wherein determining whether any other network node in the wireless network is selected as the representative portal node based on the site identifier and the destination physical address further comprises:
- identifying one or more other network nodes which are portal nodes associated with the wired network from which the frame is received;
- sending an inquiry comprising the site identifier and the destination physical address;
- receiving a response from the one or more other network nodes; and
- determining whether any of the one or more other network nodes is selected as the representative portal node based on the response.

21. The non-transitory computer-readable storage medium of claim 16 storing further instructions that when executed by the one or more processors within the first network node cause the first network node to:
- determine whether the destination physical address indicates that the frame is a multicast frame; and
- multicast the frame to a group of network nodes based on the destination physical address in response to the destination physical address indicating that the frame is the multicast frame.

22. The non-transitory computer-readable storage medium of claim 17, storing further instructions that when executed by the one or more processors within the first network node and further in response to determining that the source physical address is not associated with a previously received frame cause the first network node to drop the frame.

* * * * *